April 6, 1971  H. A. McMASTER ETAL  3,573,889
METHOD SHAPING, TEMPERING AND LAMINATING GLASS SHEETS
Filed June 16, 1969  3 Sheets-Sheet 2

INVENTORS
Harold A. McMaster,
BY John J. Kawecka, &
Norman C. Nitschke
Barnard, McGlynn & Reising
ATTORNEYS United States Patent Office 3,573,889
Patented Apr. 6, 1971

3,573,889
METHOD FOR SHAPING, TEMPERING AND
LAMINATING GLASS SHEETS
Harold A. McMaster, Woodville, Norman C. Nitschke,
Perrysburg, and John J. Kawecka, Toledo, Ohio, assignors to Permaglass, Inc., Millbury, Ohio
Filed June 16, 1969, Ser. No. 833,813
The portion of the term of the patent subsequent to
Sept. 23, 1986, has been disclaimed
Int. Cl. C03b 27/00
U.S. Cl. 65—62                7 Claims

ABSTRACT OF THE DISCLOSURE

A method for making a tempered laminated window wherein a first sheet of glass is supported on fluid and heated to a temperature sufficient for deforming and tempering and thereafter lifted with an endless ring frame to force the sheet into engagement with a shaped surface. The sheet of glass is then tempered or cooled while supported on the frame. A second sheet is shaped with the exact same frame so that it has the same shape as the first sheet. The two tempered sheets of glass are then laminated. The laminating of the two tempered sheets of glass is possible because they are both supported and shaped by the same shaping frame and are cooled to rigidity before being removed from the shaping frame so that they are substantially exact duplicates.

---

This invention relates to a method for making a tempered laminated window.

In recent years, there has been a greatly increased demand for curved glass sheets for use as automobile windows, television screens, architectural glass, etc. Also, there has been ever increasing recognition of the advantages of tempered glass, particularly its high strength and safety features. There is, therefore, a large demand for windows of relatively thin tempered curved glass. The normal procedure in manufacturing tempered curved glass requires that an individual piece of glass be cut and then formed into a particular shape and then tempered. In order to manufacture curved tempered glass automobile windows, or the like, the essential steps are: (1) forming an untempered glass sheet to proper size, with the edges rounded and polished as desired, (2) heating and bending the sheet to the curvature required, and (3) rapidly and uniformly cooling the curved sheet to provide the temper.

A stock method for bending a sheet of glass to the desired curved configuration is to heat the sheet of glass to its softening or deformation temperature and then pressing the sheet between two mating curved mold surfaces. This press bending method of curving glass sheets involves the heating of the glass sheet in a furnace to its deformation temperature and then moving the glass sheet to a position between the mating curved molds where it is curved as the molds are moved together. In order to temper the curved glass, it is removed from between the molds and positioned in a medium for cooling, such as a blasthead which impinges cool fluid upon the sheet. Normally, the sheet of glass is supported vertically by a plurality of tongs which engage the upper edge of the sheet. In order for a sheet of glass to be at a sufficiently high temperature for tempering after it is removed from the press molds, the sheet of glass must be heated to a very high temperature in the furnace before it is placed between the molds. Because the sheet of glass must be heated to such a high temperature before it is positioned between the molds, it is soft and very susceptible to marring or distortion in the areas adjacent its contact with the tongs by which it is supported. Another problem associated with this method of treating glass is that the curved shape of the sheet of glass may change during the period it is being moved from the molds to the medium for cooling due to plastic flow when it is very hot and/or due to a non-uniform change in temperature across the sheet during this period. That is, the sheet of glass is not heated as it is being curved and is subject to non-uniform cooling before being placed in the tempering medium, which non-uniform cooling causes the curvature of the sheet to change after pressing. In addition, any cooling of the sheet during the period it is being transferred from the molds to the tempering medium changes the overall ratio of cooling and may adversely affect the final temper of the sheet.

Windshields for automobiles must have high strength characteristics and should not shatter in a dangerous manner when broken. Heretofore, these characteristics have been attained to various degrees in one of two ways. The first is to laminate two non-tempered sheets of glass. The second is to temper a sheet of glass by quenching or rapidly cooling the glass from a temperature above its strain point to establish compressive stress in the surfaces of the glass which in turn increases its overall strength characteristics. Laminated windows of the prior art, which consist of untempered glass sheets, do not have the impact resistance that tempered glass sheets do. In the past it has not been possible to produce laminated glass windshields from tempered sheets because there is a tendency for the glass sheets, after being bent, to become distorted so that successive sheets vary substantially in tolerances.

Accordingly, it is an object and feature of this invention to provide a method for manufacturing a tempered laminated windshield wherein successive sheets of glass which are bent and tempered are substantially duplicates in that the variance in tolerances are closer than heretofore attainable.

Other objects and attendant advantages of this invention will be readily appreciated as the same becomes better understood by reference to the following detailed description when considered in connection with the accompanying drawings wherein.

Figure 1:
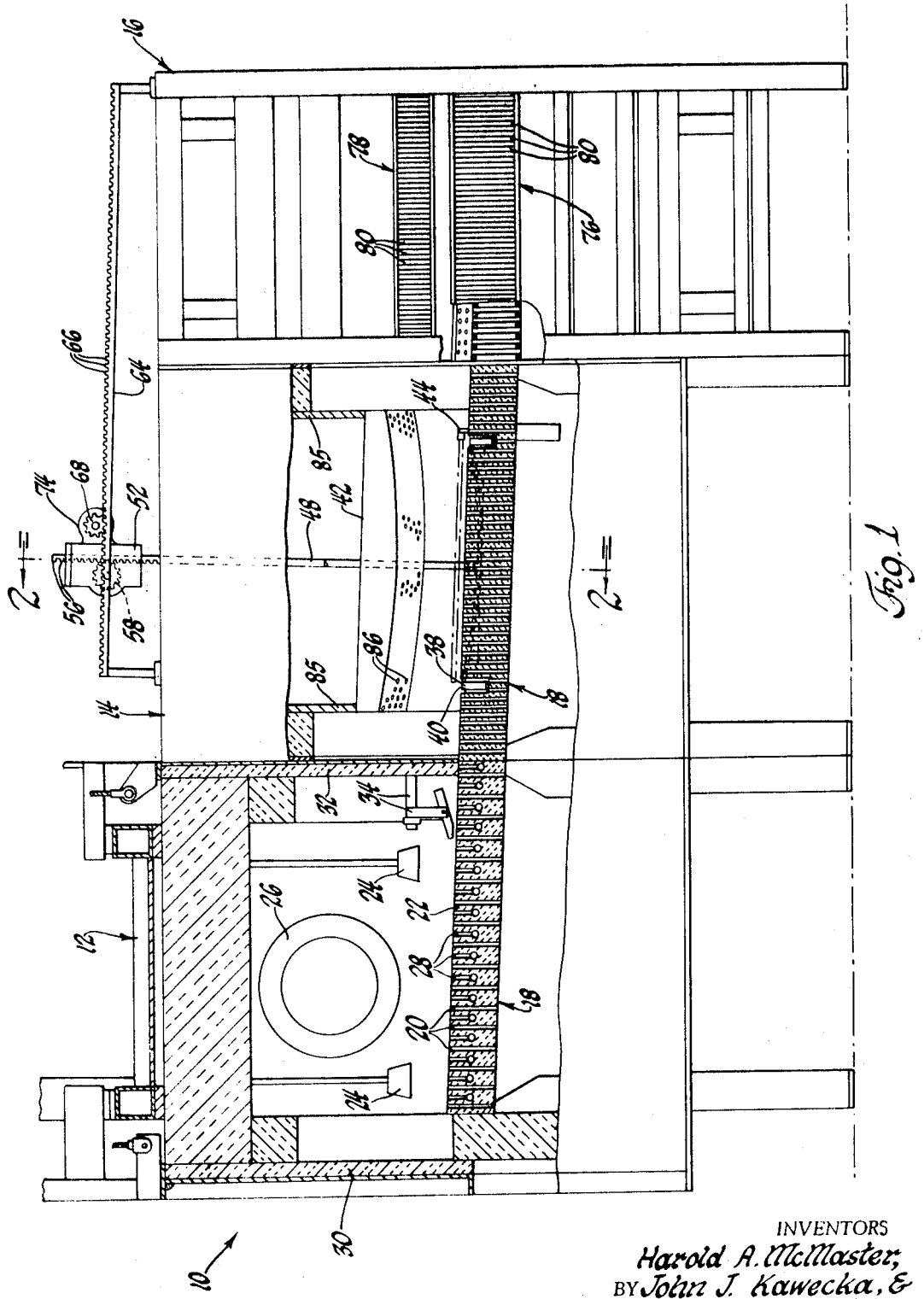
FIG. 1 is a cross sectional view partially broken away of a preferred embodiment of the instant invention.
Figure 2:
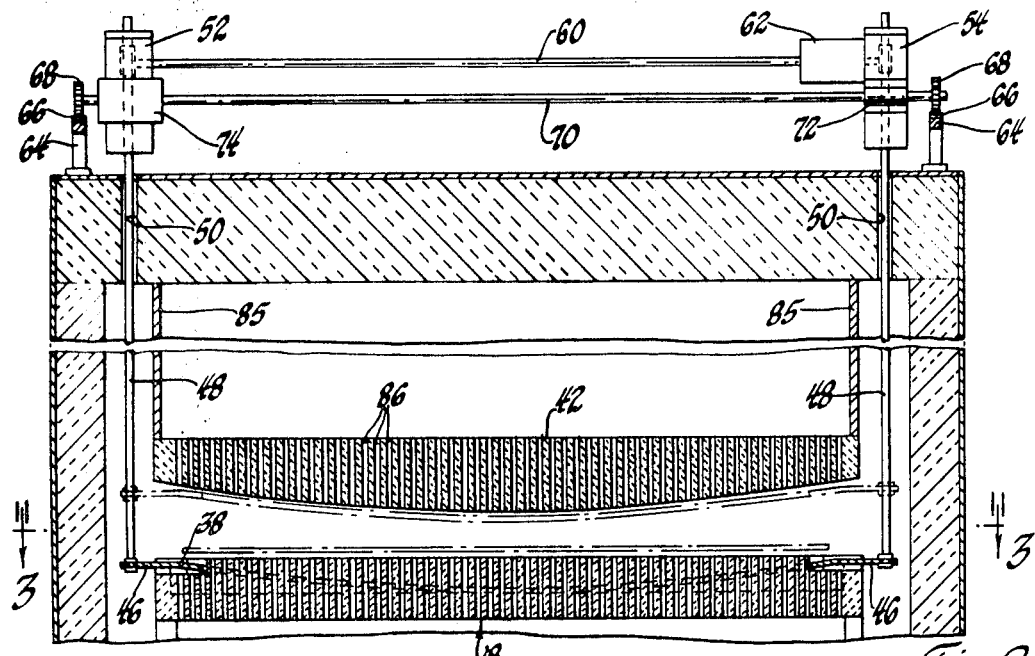
FIG. 2 is a cross sectional view taken substantially along line 2—2 of FIG. 1.
Figure 3:
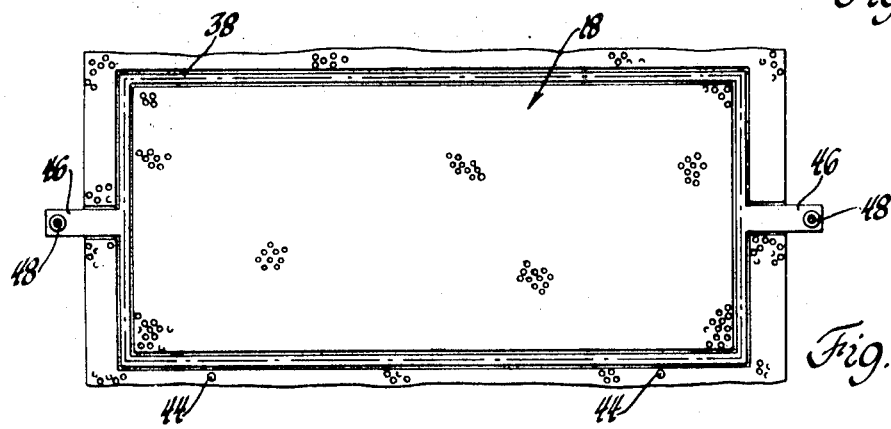
FIG. 3 is a fragmentary cross sectional view taken substantially along line 3—3 of FIG. 2.

Referring now to the drawings wherein like numerals indicate like or corresponding parts throughout the several views, an apparatus for treating sheet material such as glass is generally shown at 10. The apparatus includes a flow control means, which includes the furnace section 12 and the bending section 14 for heating a substantially flat sheet of glass while floating the sheet on fluid, and a cooling means comprising the blasthead 16.

A bed, generally indicated at 18, is disposed in the furnace section 12 and extends into the bending section 14. The bed has inlet passages 20 therein for supplying fluid above the upper flat surface 22 of the bed for floating a sheet of glass above the upper surface 22. The heaters 24, which may be electrically or gas operated, are disposed in the furnace for heating a sheet of glass as it floats above the upper surface 22 of the bed 18. One or more blowers 26 are disposed in the furnace 12 for circulating the fluid in the furnace and through the inlet passages 20. The bed 18 also includes outlet or exhaust passages 28 so that the fluid flows upwardly through the inlet passages 20 and between the upper surface 22 and a sheet of glass to adjacent outlet or exhaust passages 28. The furnace section 12 includes a front door 30 which is raised for inserting a sheet of glass into the furnace and a rear door 32 which is raised to allow the floating sheet of glass to move into the bending section 14. A stop means including the arm 34 and the pivoted lever 36 are attached to the door 32 for engaging a sheet of glass. It will be noted that the upper surface 22 of the bed 18 slants downwardly from the furnace section 12 into the bending section 14. Thus, a component of force due to the weight of the sheet of glass urges the floating sheet of glass to move from the furnace section 12 to the bending section 14. The pivoted lever 36 engages the edge of a floating sheet of glass in the furnace section 12 to prevent the sheet of glass from floating into the bending section 14 until the door 32 is raised.

A sheet engaging means comprising the endless frame 38 is disposed in a recess 40 in the bed 18 in the bending section 14. The endless frame 38 is selectively movable from the recessed position for engaging at least portions of the periphery of a floating sheet of glass for supporting and curving the sheet.

A shaped mold 42, which is illustrated as convex but which may be one of various shapes, is disposed in the bending section 14 in spaced relationship to and above the frame 38. A pair of stops comprising solenoid actuated plungers 44, or the like, are disposed in the bending section 14 for engaging the floating sheet of glass as it floats into the bending section 14 to stop movement of the floating sheet of glass at the the desired position above the endless frame 38. The plungers 44 are retracted into the bed 18 when the sheet of glass is moved into the blasthead 16.

A pair of arms 46 extend from opposite ends of the endless frame 38 and are connected respectively to the rods 48. The rods 48 extend upwardly adjacent the opposite ends of the mold 42 through slots 50 and into the housings 52 and 54 respectively. The upper end of each rod 48 includes the gear teeth 56 forming a rack to engage a gear 58. The gears 58 are disposed in the respective housings 52 and 54 and are connected to a shaft 60, the shaft 60 being driven by an electric motor 62 which is attached to the housing 54. Hence, upon activation of the motor 62, the shaft 60 is rotated to rotate the gears 58 which in turn moves the rods 48 in unison vertically.

A pair of rails 64 are attached to the top of the bending section 14 and the blasthead 16 and include the gear teeth 66 forming racks for engaging the gears 68. The gears 68 are attached to opposite ends of a shaft 70. The shaft 70 is attached to the housing 54 by being rotatably journaled in the bracket 72 and is driven by a motor 74, the motor 74 being attached to the housing 52. The slots 50 extend across the tops of the bending section 14 and the blasthead 16 so as to be substantially coextensive with the rails 64 so that upon rotation of the shaft 70 by the electric motor 74 the gears 68 rotate to move the housings 52 and 54 horizontally, which in turn moves the frame 38 horizontally. Thus, the frame 38 may be moved from the bending section 14 into the blasthead 16.

The blasthead 16 is disposed adjacent the bending section 14 for receiving a curved sheet of glass to direct cool fluid against the curved sheet for tempering the glass. The blasthead includes spaced flow directing units, generally indicated at 76 and 78. Each of the units 76 and 78 includes a plurality of passages 80 for directing fluid against opposite surfaces of the curved sheet. Although the opposed surfaces of the units 76 and 78 are shown as curved to accommodate the curved sheet of glass, they need not necessarily be curved.

In operation, a sheet of glass is floated above the upper flat surface 22 of the bed 18 in the furnace section 12 while being heated to a deformation temperature which is sufficient for tempering a sheet of glass. Thereafter, the door 32 is raised to disengage the pivoted lever 36 from the edge of the sheet of glass whereby the sheet of glass floats under the force of gravity into the bending section 14 where it contacts the plungers 44 while floating above the bed 18. An appropriate electrical circuit (not shown) sequences the motors 62 and 74 so that when the sheet is in contact with the plungers 44 and floating above the frame 38, the motor 62 is activated to raise the rods 48 whereby the frame 38 engages the periphery of the floating sheet to support the sheet and to move the sheet against the surface of the mold 42 for forming or curving the sheet. After the glass has been curved, the motor 62 rotates in the opposite direction to move the rods 48 downward a sufficient distance to align the sheet of glass and the frame 38 with the space between the units 76 and 78 of the blasthead 16. Thereafter, the motor 74 is activated to rotate shaft 70 and gears 68 to move the rods 48 horizontally so that the frame 38 carries the formed curved sheet of glass into the space between the flow directing units 76 and 78 of the blasthead 16 where the sheet of glass is subjected to cooling fluid being ejected from the passages 80. As the sheet of glass is supported by the endless frame 38 in the blasthead 16 for cooling, the motor 74 is sequenced to move the frame 38 back and forth between opposite sides of the blasthead 16 to oscillate the curved sheet of glass in the blasthead, thus accomplishing a uniform heat transfer over the entire area of the sheet of glass to provide uniform tempering.

The continual support of the sheet of glass on the frame 38 while it is being curved and until it is cooled in the blasthead is a significant feature of the instant invention in that very hot glass is subject to plastic flow and other distortions and by supporting the sheet in the manner that it is supported by the frame 38 a much hotter sheet may be processed without distortion of the glass. In other words, the quenching of the sheet by subjecting the sheet to cool fluid while supported on the frame 38 so as to render the sheet rigid so that it will not change shape before being removed from the frame, allows successive sheets to be shaped as duplicates because there is no consequential distortion or tolerance variances from sheet to sheet.

In the embodiment illustrated, the fluid passing through the inlet passages 20 in the bed 18 in the bending section 14 is preferably heated to maintain the sheet of glass at a constant temperature sufficient for tempering while it is being curved and to prevent a non-uniform change in temperature of the sheet after it is curved and before it is tempered for maintaining its curvature constant. In accordance therewith, the mold 42 also includes inlet passages 86 which may be utilized to impinge heated fluid on the upper surface of the sheet of glass before and after it has been curved to maintain it at a temperature sufficient for tempering and to prevent a change in temperature of the sheet so that the sheet can be properly tempered and so that the sheet will not change its curvature due to a non-uniform change in temperature before being tempered. A duct work 85 is provided to direct fluid to the passages 86. Alternatively, a vacuum may be applied in the passages 86 to urge the surface of the glass sheet against the convex mold 42 as it is being curved to conform the glass sheet to the shape of the mold 42.

Figure 4:
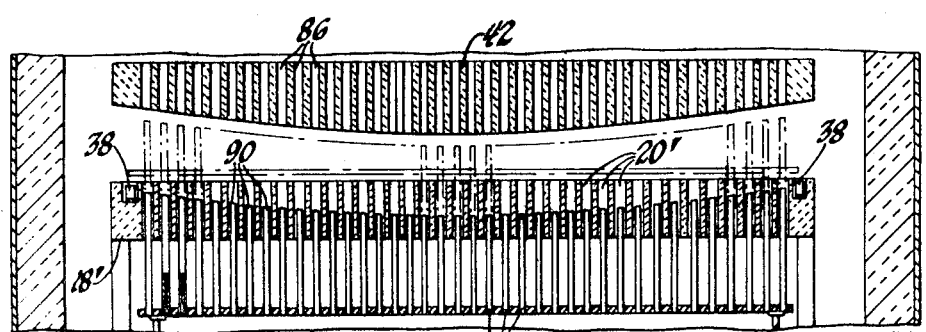
FIG. 4 is a fragmentary cross sectional view similar to FIG. 2 but showing an alternative embodiment of the instant invention.

In an alternative embodiment, the blasthead 16 may be eliminated and the sheet of glass may be tempered in the bending section 14. An apparatus for tempering the curved sheet of glass in the bending section 14 is illustrated in FIG. 4. The apparatus of FIG. 4 is utilized in the bending section 14 and is the same as that previously described except for the inclusion of the tubes 88 which are movably disposed in the passages 20' of the bed 18'. In the operation of the embodiment of FIG. 4, the sheet of glass floats over the frame 38 and the frame 38 moves upwardly and forces the sheet of glass against the mold 42. After the sheet of glass has thus been curved, the frame 38 is moved downwardly to space the sheet only a slight distance from the surface of the mold 42. The upper ends 90 of the tubes 88 form a contour which matches the contour of the mold 42 so that each upper end 90 is disposed at substantially equal distance from the surface of the mold 42. In a first position, as illustrated in FIG. 4, the upper ends 90 of the tubes 88 are withdrawn into the passages 20' of the bed 18' so that the flat glass sheet may float to a position above the endless frame 38. After the glass sheet has been curved and moved a slight distance away from the surface of the mold 42, the tubes 88 are moved upward to a second position so that the upper ends 90 are disposed above the bed 18' and in closely spaced relationship to the bottom of the sheet of glass. Cooling fluid then flows through the passages 86 in the mold 42 and through the tubes 88 for impingement upon the upper and lower surfaces of the curved sheet of glass for rapidly cooling the sheet of glass immediately after it has been curved.

It is also possible to curve a sheet of glass in the apaparatus described without utilizing a mold in that the sheet of glass may be suppotred on the frame 38 above the bed 18 and allowed to sag to the degree of curvature desired. When the sheet of glass has sagged to the desired degree of curvature, it is immediately subjected to a cool medium for tempering whereby it becomes rigid.

As an added feature, the instant invention may utilize means for contacting the sheet at spaced points while it is supported on the frame to lift the sheet from the frame when the sheet has become sufficiently rigid not to deform, thus allowing full tempering in those areas of the sheet which are in contact with the frame when the sheet is supported thereby. Such may be accomplished by floating the sheet off the frame when it has become sufficiently rigid. Also, fingers normally recessed in the frame and movable above the frame may be utilized to lift the sheet from the frame. Alternatively, elongated fingers may be inserted into the aperture to lift the sheet from the frame.

The furnace section 12 is illustrated as a single station section whereby a sheet of glass inserted into the furnace section through the door 30 and floats above the bed 18. However, in order to heat a sheet of glass more uniformly, relative movement may be established between the sheet of glass and the upper surface 22 of the bed 18. This may be accomplished by elongating the bed 18 and moving the floating sheet of glass along the bed 18 in the furnace section while the sheet of glass is being heated. An apparatus which may be utilized for this purpose is disclosed in U.S. Pat. 3,332,759 which is assigned to the assignee of the instant invention. Alternatively, the sheet of glass may be oscillated back and forth over the upper surface 22 of the bed 18 in the furnace section 12. An apparatus which is suitable for this purpose is covered in U.S. application Ser. No. 548,752 filed May 9, 1969, in the name of Harold A. McMaster and assigned to the assignee of the instant invention and now U.S. Pat. 3,485,612, which apparatus may also be suitably utilized in the blasthead 16 for oscillating the glass instead of supporting the sheet of glass on the frame 38 between the flow direction units 76 and 78. In addition, the bed 18 need not be slanted downward into the bending section 14 but may have a substantially horizontal upper surface 22, in which case an appropriate conveying or transfer mechanism will be utilized to move the sheets of glass from the furnace section 12 to the bending section 14. It is also to be understood that the frame for supporting and forcing the sheet against the mold surface need not be endless and may be in one of various different forms. Also, the frame need not be recessed into the bed but may surround a bed. Alternatively, the sheet engaging means may take the form of a mating mold having a surface which mates the surface of the upper mold 42 and which mating mold is moved into position to engage and urge the sheet against the upper mold.

Successive sheets of glass curved and tempered as described thus far are within very close tolerances of one another and are of substantially identical shape and, therefore, may be laminated together. Such sheets of glass are successively identical because the sheets of glass are lifted off a support structure after having been heated to a deformation' temperature, which is sufficient for bending and tempering, by a frame which shapes the sheet, as by pressing the sheets into engagement with a shaped surface. In other words, to manufacture or make a tempered laminated window or windshield, a first sheet of glass is supported in a generally horizontal disposition as the sheet is heated to a temperature sufficient for deforming and tempering thereof. Subsequently, the first sheet is lifted from the support with an open-centered-endless-loop frame by engaging the periphery of the first sheet. The first sheet is lifted by the frame into engagement with a shaped surface or mold for conforming the sheet to the shaped surface of the mold. Thereafter, the sheet is quenched with cooling fluid to the extent that the surfaces thereof have a surface compression greater than 5,000 p.s.i. In other words, the surface compression in the surfaces of the sheet of glass after having been tempered is not less than 5,000 p.s.i. It is important that the first sheet of glass be sufficiently quenched while supported on the frame that it retains its shape upon removal from the frame. In other words, the sheet is quenched sufficiently that it is rigid before being removed from the frame. In a similar manner, a second sheet of glass is supported in a generally horizontal disposition and is heated to a temperature sufficient for deforming and tempering thereof. It is to be understood that, although the preferred embodiment of the instant invention discloses the sheet of glass being supported on fluid before being lifted by the frame, the sheet of glass may be heated to a temperature sufficient for deforming and tempering thereof while supported by means other than a fluid as, for example, rollers. The second sheet of glass is also lifted from the support and pressed against the shaped surface so that it is conformed to the shaped surface and into a shape which is substantially identical to the shape of the first sheet. That is, successive sheets of glass are pressed to exactly the same shape. The second sheet of glass retains the shape by being quenched with a cooling fluid while supported on the frame to the extent that it becomes rigid before being removed from the frame. The sheet is quenched to the extent that it also has surface compression greater than 5,000 p.s.i. It is to be understood that the successive sheets of glass may be totally quenched while supported on the frame or may be quenched to the extent that they are rigid whereby they may be removed from the frame and additionally quenched to obtain the desired degree of temper.

Successive sheets of glass, whether they be one after the other or spaced from one another by other sheets of glass, are then placed together with a plastic layer therebetween to form an assembly for lamination.

Figure 5:
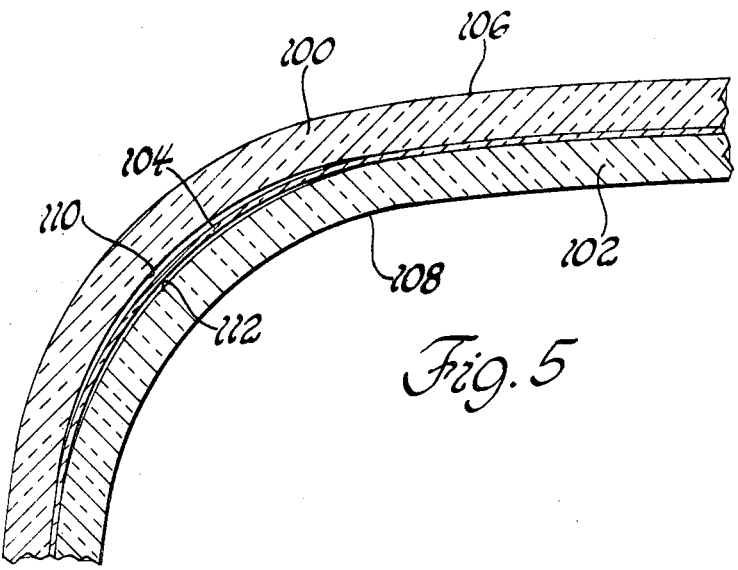
FIG. 5 is an enlarged fragmentary view of two sheets of tempered glass sandwiched with a layer of plastic prior to being subjected to pressure and heat for lamination.

As shown in FIG. 5, an outer sheet of tempered glass 100 is placed in sandwiched relationship when an inner sheet of tempered glass 102 and the plastic layer 104 is disposed therebetween. As illustrated in FIG. 5, the sheets of glass 100 and 102 are of identical configuration so that when the curved portions thereof are disposed adjacent to one another before being forced together in the laminating process, there is a resulting space between the two sheets of glass in which the plastic layer 104 is disposed.

Figure 6:
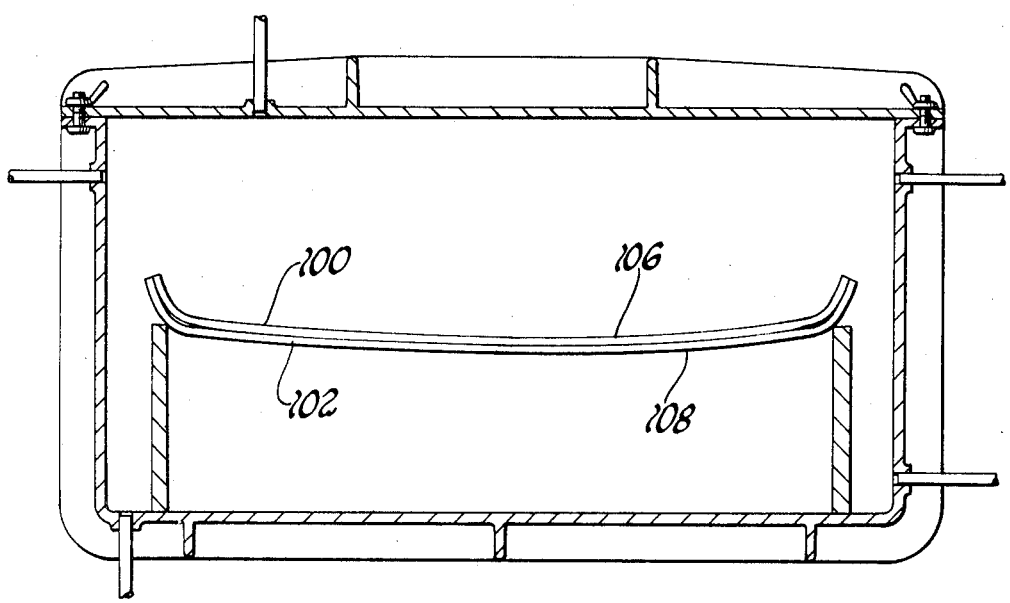
FIG. 6 is a cross sectional view of an autoclave utilized in the laminating of the two sheets of glass in accordance with the instant invention.

FIG. 6 is a cross sectional view of an autoclave in which a sheet of glass is placed to subject the outer surfaces 106 and 108 of the sheets in the assembly to pressure to force the sheets into bonding engagement with the plastic layer 104. The assembly is subjected to heat whereby the inner surfaces 110 and 112 of the sheets 100 and 102 are bonded to the plastic layer 104. By way of example, the plastic layer 104 may comprise polyvinyl butyral plastic (PDB) approximately 0.015 inch thick which has a softening temperature of approximately 234° F. It may be desirable to stretch the plastic layer 104 when it is disposed between the two sheets 100 and 102 before pressure is applied. The autoclave temperature is generally not more than 290° F. with a satisfactory temperature being 265° F. The autoclave may be pressurized with fluid or gas to subject the outer surfaces 106 and 108 of the sheets of the assembly to a pressure of approximately 250 p.s.i. This may be applied for a period of three (3) to ten (10) minutes.

As disclosed in FIG. 5, when the sandwiched sheets of glass in the assembly are subjected to pressure on the outer surfaces 106 and 108 thereof, the curved portions of the sheets change slightly in configuration such that the bend in the outer sheet (or degree of curvature) decreases whereas the bend in the inner sheet (or degree of curvature) increases. In so doing, the surface compression in the outer surfaces 106 and 108 in the curved portions of the sheets of glass increases while the surface compression on the inner surfaces 110 and 112 of the sheets of glass decreases.

The sheets of glass may also be laminated in accordance with the teachings of U.S. Pat. 3,281,296 wherein a sealing strip or tire is disposed about the degree of the sheets of glass and a vacuum is applied thereto to evacuate any air between the sheets of glass as heat is applied to bond the two sheets of glass together through the plastic layer 104.

If the degree of bend in two successive sheets of glass is large enough, the two sheets fo glass will be of two different sizes in terms of overall area and peripheral configuration when in the flat form before being bent. In other words, one sheet of glass is larger than the other and would be used as the outer sheet of glass 100 so that when the two sheets are curved and laminated together their edges or ends will be substantially coplanar or aligned, i.e., the two sheets will be coextensive.

The embodiments of the invention in which an exclusive property or privilege is claimed are defined as follows:

1. A method for making a tempered laminated window comprising; supporting a first sheet of glass in a generally horizontal disposition, heating said first sheet to deformation temperature, lifting said first sheet with a sheet shaping means which is moved upwardly to engage and shape said first sheet, at least partially tempering said first sheet while said first sheet is supported on said shaping means, removing the first sheet from the sheet shaping means, subsequently supporting a second sheet of glass in a generally horizontal disposition, heating said second sheet to deformation temperature, lifting said second sheet with said sheet shaping means which is moved upwardly to engage and shape said second sheet, at least partially tempering said second sheet while said second sheet is supported on said shaping means, removing the second sheet from the sheet shaping means, and laminating said first and second sheets together.

2. A method as set forth in claim 1 further defined as moving said first sheet into engagement with a shaped surface while being lifted by said shaping means for conforming said first sheet to said shaped surface, and moving said second sheet into engagement with said shaped surface while being lifted by said shaping means for conforming said second sheet to said shaped surface.

3. A method for making a tempered laminated window comprising: supporting a first sheet of glass in a generally horizontal disposition, heating said first sheet to deformation temperature, lifting said first sheet with a sheet shaping means which is moved upwardly to engage and shape said first sheet, tempering said first sheet to the extent that the surfaces thereof have a surface compression greater than 5,000 p.s.i. and at least partially tempering said first sheet by quenching sufficiently that it becomes rigid while supported on said shaping means, removing said first sheet from the sheet shaping means, subsequently supporting a second sheet of glass in a generally horizontal disposition, heating said second sheet to deformation temperature, lifting said second sheet with said sheet shaping means which is moved upwardly to engage and shape said second sheet, tempering said second sheet to the extent that the surfaces thereof have a surface compression greater than 5,000 p.s.i. and at least partially tempering said second sheet by quenching sufficiently that it becomes rigid while supported on said shaping means, removing the second sheet from the sheet shaping means, placing said sheets together with a plastic layer disposed therebetween, and applying pressure and heat to bond said sheets to said plastic layer 4. A method as set forth in claim 3 further defined as applying pressure to the outer surfaces of said sheets to force the inner surfaces thereof into bonding engagement with said plastic layer and to increase the surface compression in at least portions of said outer surfaces while decreasing the surface compression in at least portions of said inner surfaces.

5. A method as set forth in claim 3 further defined as moving said first sheet into engagement with a shaped surface while being lifted by said shaping means for conforming said first sheet to said shaped surface, and moving said second sheet into engagement with said shaped surface while being lifted by said shaping means for conforming said second sheet to said shaped surface.

6. A method as set forth in claim 5 further defined as applying pressure to the outer surfaces of said sheets to force the inner surfaces thereof into bonding engagement with said plastic layer and to increase the surface compression in at least portions of said outer surfaces while decreasing the surface compression in at least portions of said inner surfaces.

7. A method for making a tempered laminated window comprising: supporting a first sheet of glass in a generally horizontal disposition, heating said first sheet to a temperature sufficient for deforming and tempering thereof, lifting said first sheet with an open-centered-endless loop frame by engaging the periphery of said first sheet, lifting said first sheet into engagement with a shaped surface with said frame for conforming said first sheet with said shaped surface, quenching said first sheet sufficiently while supported on said frame that it will retain its shape upon removal from said frame, removing the first sheet from said frame, subsequently supporting a second sheet of glass in a generally horizontal disposition, heating said second sheet to a temperature sufficient for deforming and tempering thereof, lifting said second sheet with said frame by engaging the periphery of said second sheet, lifting said second sheet into engagement with said shaped surface with said frame for conforming said second sheet into the same shape as said first sheet, quenching said second sheet with cooling fluid to the extent that the surfaces thereof have a surface compression greater than 5,000 p.s.i., quenching said second sheet sufficiently while supported on said frame that it will retain its shape upon removal from said frame, removing the second sheet from said frame, placing said sheets together with a plastic layer therebetween to form an assembly, heating said assembly, and applying pressure to said assembly to bond the inner surfaces of said sheets to said plastic layer while decreasing the surface compression in the curved portions of said inner surfaces and increasing the surface compression in said curved portions of the outer surfaces of said sheets as the degree of bend in said curved portions of the sheets on the outside of the bend is decreased and the degree of bend in said curved portions of the sheets on the inside of the bend is increased.

References Cited

UNITED STATES PATENTS

| | | | |
|---|---|---|---|
| 2,869,287 | 1/1959 | Bamford | 65—273X |
| 3,265,484 | 8/1966 | Ritter, Jr. | 65—104 |
| 3,468,645 | 9/1969 | McMaster et al. | 65—104 |

ARTHUR D. KELLOGG, Primary Examiner

U.S. Cl. X.R.

65—104, 106, 182, 273, 275, 289